United States Patent
Gu et al.

(10) Patent No.: US 11,207,854 B2
(45) Date of Patent: Dec. 28, 2021

(54) METHOD FOR MANUFACTURING TORIC CONTACT LENSES

(71) Applicant: Alcon Inc., Fribourg (CH)

(72) Inventors: Yeming Gu, Suwanee, GA (US); Curtis Dean McKenney, Duluth, GA (US); Cornelius Daniel Niculas, Suwanee, GA (US)

(73) Assignee: Alcon Inc., Fribourg (CH)

( * ) Notice: Subject to any disclaimer, the term of this patent is extended or adjusted under 35 U.S.C. 154(b) by 203 days.

(21) Appl. No.: 16/708,685

(22) Filed: Dec. 10, 2019

(65) Prior Publication Data

US 2020/0183192 A1 Jun. 11, 2020

Related U.S. Application Data

(60) Provisional application No. 62/777,378, filed on Dec. 10, 2018.

(51) Int. Cl.
| | |
|---|---|
| *B29D 11/00* | (2006.01) |
| *G02B 3/06* | (2006.01) |
| *G02C 7/04* | (2006.01) |
| *G02C 13/00* | (2006.01) |

(52) U.S. Cl.
CPC .. *B29D 11/00019* (2013.01); *B29D 11/00038* (2013.01); *B29D 11/00134* (2013.01); *B29D 11/00509* (2013.01); *G02B 3/06* (2013.01); *G02C 7/048* (2013.01); *G02C 13/001* (2013.01)

(58) Field of Classification Search
CPC ........ B29D 11/00019; B29D 11/00134; B29D 11/00038; B29D 11/00509; G02B 3/06; G02C 7/048; G02C 13/001
See application file for complete search history.

(56) References Cited

U.S. PATENT DOCUMENTS

| | | |
|---|---|---|
| 6,669,460 B1 | 12/2003 | Kok-Ming et al. |
| 2019/0193350 A1* | 6/2019 | Gu ..................... B29C 33/3842 |

* cited by examiner

*Primary Examiner* — Mathieu D Vargot
(74) *Attorney, Agent, or Firm* — Sheng-Hsin Hu

(57) ABSTRACT

A method of manufacturing of an astigmatic contact lens having a toric portion and a thickness differential feature to provide lens orientation on eye portion such that said thickness differential causes the toric portion of the contact lens to properly orient in the eye of the wearer. The toric lenses are manufactured by an effective process control method for cylinder power in toric lens production by determining an amount of a mold cylinder compensation which is caused by processes in a toric lens manufacturing system including tool making, injection molding, casting and curing, wherein the mold cylinder is defined as the difference in measured radius of curvature at two orthogonal directions. A control metric is established by using the amount of a mold cylinder compensation and tolerance range and reject mold out of the control limits and improve the production yield for toric lens manufacturing.

10 Claims, 1 Drawing Sheet

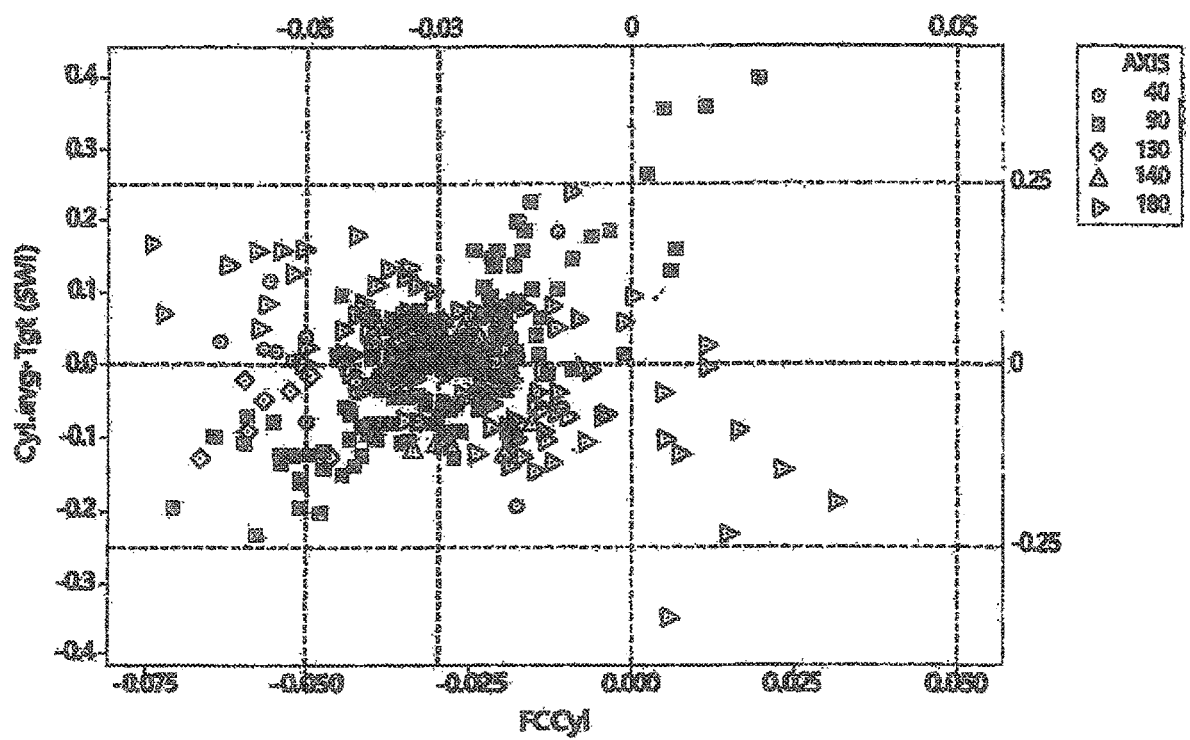

METHOD FOR MANUFACTURING TORIC CONTACT LENSES

This application claims the benefit under 35 USC § 119 (e) of U.S. provisional application No. 62/777,378, filed on 10 Dec. 2018, incorporated by reference in its entirety.

This invention relates to a manufacturing process of toric contact lenses. More specifically, the invention relates to the manufacturing of different toric lenses with a good process capability for cylinder power and cylinder axis control.

BACKGROUND OF THE INVENTION

Astigmatism is a defect in the eye that can be corrected by a lens with a non-spherical prescription. The prescription, which is usually expressed as cylinder on the patient's prescription order, causes at least a portion of the surface of the lens to have the shape of a toric segment. Hence, such lenses are called toric lenses. Toric contact lenses, which include an optical zone providing a cylindrical correction for patients having certain astigmatic abnormalities. Unlike contact lenses having only a spherical correction, which may generally be placed on the eye in any rotational position, toric lenses are positioned on the patient's eye such that the optical zone's toric axis is aligned with the eye's astigmatic axis.

Astigmatism occurs when a portion of the eye focuses light at a different focal point than the rest of the eye, i.e., it is a refractive error of the eye in which the rays of light do not come to a single point focus on the retina. Toric lenses with cylinder power typically are used to correct for astigmatism. For toric lenses, the cylinder power is defined by the different radius values in two orthogonal directions, with one direction aligned with the cylinder axis. The cylinder power of the toric lens results in the eye focusing light rays at a common focal point.

Toric lenses comprise two basic design components, that is a cylinder to correct astigmatism of the eye and a lens thickness feature (such as prism ballast or double slab off) for orienting and insuring positional stability when the contact lens is placed on the cornea. Non-astigmatic lenses do not have such a requirement and the lens has no preferred orientation. Toric lenses, on the other hand, require proper, rather precise, orientation on the eye. One method used to achieve the desired lens orientation is to provide a region of thicker of material at or proximate an edge of the lens so that, in use, when the lens rotates the thicker edge will be oriented inferior by the force of the lids during blinking to serve to stabilize the lens on the eye. This is known in the art as prism ballast. Double Slab-Off differs from prism-ballasted lenses in edge thickness. There is a central, thicker horizontal band that will align within the palpebral fissure with each blink. This design is also known as dynamic stabilization. Multiple studies report that dynamic stabilization techniques are most stable for against-the-rule refractive corrections, as the most minus and thickest meridians of the lens align between the eyelids, yet others found low myopic astigmats to be good candidates for this design. Double slab-off lens designs also stay better aligned when the head positioning is away from the vertical axis. This could benefit patients who are highly active or those who require fine vision outside the typical workspace (e.g., a car mechanic or electrician).

If the prism ballast or double slab off and the toric optical zones are formed on the same lens surface, the optical tools (or molds) forming that surfaces would define both characteristics. Thus, for given ballast and toric optical zone designs, a separate optical tool is required for every offset angle. To reduce the number of required optical tools, the ballast and the toric zone may therefore be defined on opposite contact lens surfaces, and therefore on opposite lens tools (or molds). For instance, the ballast may be defined by the front curve mold half while the toric optical zone is defined by the back curve mold half. Accordingly, the resulting mold halves may be rotated with respect to each other to achieve a desired axis angle.

Toric lenses have to meet a tight tolerance range for cylinder axis (±5°). In addition, it is also important that toric lenses have to meet a tight tolerance range for cylinder power. Poor process capability for cylinder power and cylinder axis control produces toric lenses having high process variation in cylinder power and cylinder axis and can cause significant yield loss in production. This significant yield loss makes toric lenses manufacturing more expensive.

Hence, for reasons of efficiency and cost-effectiveness, there is a continuing need for improving process capability for both cylinder axis control and cylinder power control. More specifically, the invention relates to the manufacturing of different toric lenses with a good process capability for cylinder power control.

SUMMARY OF THE INVENTION

The invention is related to a method for manufacturing a toric contact lens, the method comprising the steps of:

a. determining an amount of a mold cylinder compensation which is caused by processes in a toric lens manufacturing system including tool making, injection molding, casting and curing wherein the mold cylinder is defined as the difference in measured radius of curvature at two orthogonal directions.

b. Injection molding to form an anterior mold half and a posterior mold half for the same toric lens manufacturing system as in step a), wherein the posterior mold half or the anterior mold half has a toric portion and the other mold half has a prism ballast or double slab off, wherein each mold half has a tab or other locating features for facilitating a determination of orientation of the mold, c. measuring mold cylinder value for the mold half having the prism ballast or double slab off, d. controlling the mold half having the prism ballast or double slab off to have mold cylinder value between a high limit and a low limit by rejecting the mold half having the prism ballast or double slab off falling out of the limits, wherein the high limit is equal to or larger than (the amount of the mold cylinder compensation plus a control tolerance) and the low limit is equal to or less than (the amount of the mold cylinder compensation minus the control tolerance), wherein the control tolerance is equal to or less than 0.050 mm., e. introducing a lens forming material into the anterior mold half, f. assembling the anterior mold half and the posterior mold half to form a lens shaped cavity there between, g. curing the lens forming material in the lens shaped cavity to form the toric lens.

h. repeating the steps b) to g) for the same toric lens manufacturing system.

BRIEF DESCRIPTION OF THE DRAWINGS

FIG. 1 is a scatter plot of lens cylinder power targeting error Vs. mold cylinder for the mold with a prism ballast or double slab off (FC mold).

DETAILED DESCRIPTION OF AN EMBODIMENT OF THE INVENTION

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the term "about" is included and is explicitly disclosed, unless the context clearly dictates otherwise. For example, if a range of "about" numerical value a to "about" numerical value b is disclosed, this is to be understood to include and explicitly disclose a range of numerical value a to numerical value b. Also, whenever features are combined with the term "or", the term "or" is to be understood to also include "and" unless it is evident from the specification that the term "or" must be understood as being exclusive.

The invention is related to a method for manufacturing a toric contact lens, the method comprising the steps of:

a. determining an amount of a mold cylinder compensation which is caused by processes in a toric lens manufacturing system including tool making, injection molding, casting and curing wherein the mold cylinder is defined as the difference in measured radius of curvature at two orthogonal directions.

b. Injection molding to form an anterior mold half and a posterior mold half for the same toric lens manufacturing system as in step a), wherein the posterior mold half or the anterior mold half has a toric portion and the other mold half has a prism ballast or double slab off, wherein each mold half has a tab or other locating features for facilitating a determination of orientation of the mold, c. measuring mold cylinder value for the mold half having the prism ballast or double slab off, d. controlling the mold half having the prism ballast or double slab off to have mold cylinder value between a high limit and a low limit by rejecting the mold half having the prism ballast or double slab off falling out of the limits, wherein the high limit is equal to or larger than (the amount of the mold cylinder compensation plus a control tolerance) and the low limit is equal to or less than (the amount of the mold cylinder compensation minus the control tolerance), wherein the control tolerance is equal to or less than 0.050 mm., e. introducing a lens forming material into the anterior mold half, f. assembling the anterior mold half and the posterior mold half to form a lens shaped cavity there between, g. curing the lens forming material in the lens shaped cavity to form the toric lens.

h. repeating the steps b) to g) for the same toric lens manufacturing system.

Lens molds for making contact lenses are well known to a person skilled in the art and, for example, are employed in cast molding or spin casting. Methods of manufacturing mold sections for cast-molding a contact lens are generally well known to those of ordinary skill in the art. The process of the present invention is not limited to any particular method of forming a mold. In fact, any method of forming a mold can be used in the present invention. The preferred method of making the molds of the invention is by injection molding using known techniques.

Prior to the cast molding of the contact lens, each of the mold halves is formed by injection molding a resin in the cavity of an injection molding apparatus. In injection-molding, usually two molding tools are used which can be moved towards each other to a closed position, and away from each other to an open position. Typically, one molding tool is fixedly arranged while the other molding tool is movable towards and away from the fixedly arranged molding tool, i.e. to the closed or open position, respectively. Each of the molding tools typically has a plurality of mold forming portions. In the closed position, a plurality of cavities is formed between these mold forming portions of the molding tools. Typically tools are manufactured using CNC machines. These cavities correspond in shape to the lens molds to be manufactured. To simultaneously manufacture a plurality of lens molds, a moldable plastic material, for example molten polypropylene, is injected into the cavities under high pressure. After injection of the molten plastic material is completed, the plastic material contained in the cavities is allowed to cool to form the lens molds and the molding tools are moved away from each other to the open position, so that the lens molds can be removed from the respective molding tool and can subsequently be further cooled down at a different location, thus allowing the molding tools to be used again to manufacture the next plurality of lens molds in the manner described above.

Tools or tooling inserts are used for cast molding a posterior surface and an anterior surface of a toric lens. The tooling inserts are adapted to be placed in molding apparatus to form a first mold section and a second mold section, each having a negative impression of a surface of the respective tooling insert. The surfaces of the inserts are substantially smooth surfaces corresponding to a desired toric contact lens posterior surface or anterior surface. The mold halves are typically used only once for casting a lens, the injection molding tools are used to make multiple of molds. The tools must be manufactured to extremely tight specifications so that no roughness or surface defects are transferred to the mold half being made therefrom, as any such defects on the mold surface would be transferred to the molded contact lens. The tools are typically made from aluminum alloys, brass, stainless steel, nickel or other materials suitable for optical surfaces fabrication. After machining the desired surface on the tools, the tools are typically polished to achieve precision surface quality so that no surface imperfections are transferred to the mold section being injection molded therefrom.

The tool for the injection molding of the posterior mold half has a concave toric surface for forming the toric surface on the posterior mold half (BC) and the tool for the injection molding of the anterior mold half has a convex surface for forming a prism ballast or double slab off surface on the anterior mold half (FC). According to the invention, the tool for the injection molding of the posterior mold half may have a concave surface for forming the prism ballast or double slab off surface on the posterior mold half and the tool for the injection molding of the anterior mold half may have a convex toric surface for forming a toric surface on the anterior mold half (FC). According to further variations of the described embodiments, both the anterior and posterior mold halves may include detectable indicia at a known position on the mold halves.

In general, a mold comprises two mold halves (or sections) or mold portions, i.e. male and female mold halves in double-sided molding (DSM) process. The male mold half defines a first molding (or optical) surface defining the posterior (concave) surface of a lens and the second mold half defines a second molding (or optical) surface defining the anterior (convex) surface of a lens. The first and second mold halves are configured to receive each other such that a lens forming cavity is formed between the first molding surface and the second molding surface. The molding surface of a mold half is the cavity-forming surface of the mold and in direct contact with lens-forming material.

However, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

Virtually all materials known in the art for making molds can be used to make molds for making toric contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used.

Once mold halves are formed, mold cylinder value for the mold half having the prism ballast or double slab off is measured by a video measurement device, such as the Nikon VMR, or a high-resolution interferometer, such as FISBA FS10M or equivalent models from Trioptics μShape® vertical series, provides a convenient method for this task. A video measurement device, such as the Nikon VMR or a high-resolution interferometer, such as FISBA FS10M or equivalent models from Trioptics μShape® vertical series can indirectly or directly measure the radius of curvature at two orthogonal directions. The results from VMR are best-fit radius values derived from line scans in two orthogonal directions. VMR measurements typically it do not capture the complete shape of the surface. Then mold cylinders on the mold halves are calculated. The mold cylinder is defined as the difference in measured radius of curvature at two orthogonal directions of the mold half.

Once control limits for mold cylinder are determined, inspection on the mold halves may be performed and those mold halves not meeting the control limits can be rejected. For a molding process with adequately small shot-to-shot variation, only a small number of mold samples need to be measured and compared with the control limits. The procedure for determining control limits for mold cylinder will be discussed in the later section in this specification.

A polymerizable/curable lens forming material is placed in the anterior mold half. Any lens-forming materials can be used in the invention. Lens forming materials that are suitable in the fabrication of contact lenses are illustrated by numerous issued US patents and familiar to those skilled in the art. Preferred lens-forming materials are capable of forming hydrogels. A lens-forming material can be a prepolymer, a mixture of prepolymers, a mixture of monomers, or a mixture of one or more prepolymers and one or more monomers and/or macromers. It should be understood that any silicone-containing prepolymers or any silicone-free prepolymers can be used in the present invention. According to the present invention, the fluid lens-forming composition comprises at least one member selected from the group consisting of a hydrophilic vinylic monomer, a silicone containing vinylic monomer, a silicone-containing crosslinker, a silicone-containing prepolymer, a hydrophilic prepolymer free of silicone, and combinations thereof. After the fluid lens-forming composition is dispensed into the mold, the mold halves or sections may be clamped together in an assembly step.

The anterior mold half and the posterior mold half can be assembled to form a lens shaped cavity there between with the lens mold carriers embodied in the manner in U.S. Pat. No. 6,669,460. The advantage of assembly is to hold the mold halves during the lens-forming process and rotating the halves with respect to each other to achieve a desired cylinder axis, which is the angle between BC-cylinder and the reference axis defined by the prism ballast or double slab off (indicated by the fiducial marks). However, the use of lens mold carriers as described in U.S. Pat. No. 6,669,460 is only served as an example. The present invention is also applicable to other means of holding the two molds together, for example, the molds are not kept together in a carrier but similar to the use of carriers the 2 molds are rotated and assembled together and kept together by interference fitting features on the molds, then mold assemblies are placed on trays into the curing station. For further details of lens carrier, it is referred to the description of the afore-mentioned U.S. Pat. No. 6,669,460. The embodiment of lens mold carrier can be used in the production line.

Following the mold assembly, the assembled mold halves is further processed, e.g., polymerized and/or cured, to form a toric contact lens. Polymerization/crosslinking can be initiated actinically, by means of actinic radiation, such as UV/visible light irradiation, ionizing radiation (e.g., gamma or X-ray irradiation) or thermal curing to form a contact lens. The formed lens is demolded and may be subjected to conventional additional processing steps, such as extraction, sterilization, packaging and the like Toric lenses (contact lenses for astigmatism) have to meet a tight tolerance range for cylinder power (for example +/−0.25D) and cylinder axis (+/−5°). Poor process capability for cylinder power control can cause significant yield loss in production. The present invention is partly based on the following discovery:

1) The large cylinder power target error and axis target error may come from both the front curve (FC) molds and back curve (BC) molds
2) The large cylinder power target error and axis target error come from the cumulative effects from casting through the coupling with BC mold
3) There is a sweet spot (region) for FC mold cylinder for minimizing the target errors of cylinder power and cylinder axis Any FC mold cylinder that impacts lens cylinder power will also impact lens cylinder axis.
4) When FC mold cylinder deviates too far from the sweet spot, the effective contribution from FC molds to toric lens cylinder power error increases with delta FC Cylinder almost linearly.
5) The key to reducing FC mold impact is to control FC mold Cylinder In summary, the cylinder power and cylinder axis errors are caused by the accumulation of mechanical tolerance and other process variations from tool making, tool assembly, to mold distortion caused by imperfections in the molding process. The main root cause for cylinder power error is mold distortion. Front Curve (FC) molds could cause significant error to both cylinder power and cylinder axis. However, the impact from FC molds cannot be directly linked to the measured distortion of the free-form FC molds. For example, a near-perfect FC mold with near-zero cylindrical distortion can still result in significant cylinder power error in lens. This is because the lens cylinder power error is caused by the combined effective distortion of both FC and BC molds when the two are coupled during the casting process. This poses a challenge for in-process control as it is not practical to measure the actual distortion of the optical surfaces when the two molds are assembled with liquid formulation inside the lens cavity.

Based on the above discovery, this invention identifies a simple metric based on free-form measurement of FC molds which can be used to effectively control the actual distortion in assembled molds. This is possible because of some fundamental characteristics of the Double Side Molding (DSM) process. Due to how the molds are designed and how the injection process works, there are unique and relatively stable flow-induced stress patterns in both FC and BC molds. These stress patterns affect the mold distortion in a systematic way when the two molds are assembled together.

A control metric is identified and defined with available VMR measurements. The VMR data are routinely measured during the molding targeting process as well as during the molding production runs. The key to this invention is to define a system compensation value as the target value and a tolerance range around this target for the measured free-form FC-Cylinder and then establish a control metric as the following equation:

(FC-Cylinder system compensation value)−Tolerance value≤FC-Cylinder≤(FC-Cylinder system compensation)+Tolerance value Tolerance value is determined by the considerations of both desired process capability and practical difficulty. For the present invention, tolerance value is 0.050 mm, preferably 0.040 mm, more preferably 0.030 mm, still more preferably 0.020 mm or still even more preferably 0.010 mm. The final tolerance range for production use will be based on considerations of both desired process capability and practical difficulty during molding targeting.

According to the present invention, the same toric lens manufacturing system has the same FC-Cylinder system compensation value. The same toric lens manufacturing system is defined as the system has the same molding/casting/curing process and with similar mold design. This include molding machine setup, moldbase design, Casting process includes the process of formulation dispensing, how the two molds are put together, and maintaining coupled molds with encapsulated formulation.

The key is to understand that, for a perfect process, the molds are expected to have zero cylinder. However, due to internal stress in the molds, they will change shape slightly when FC and BC molds are coupled (during and after being casted). In order for the casted molds to produce lenses with minimal cylinder error, the FC molds should have a small amount of mold cylinder when measured in free form. This optimal amount of cylinder can be determined empirically using engineering study data or available production data. Therefore, once the optimal FC-Cylinder system compensation value is determined, the value can always be used as a control parameter (target value) as long as used in the same toric lens manufacturing system.

An amount of a mold cylinder compensation is determined by examining the scatterplot of lens cylinder power targeting error Vs. FC-mold cylinder and finding the FC-mold cylinder value (along x-axis) which corresponds to the minimum scattering in lens cylinder power targeting error (y-axis) as illustrated in FIG. 1. Similar graphs for cylinder axis targeting error can be used as well.

Applicants believe the above results, without bounding by the theory, based on the following understandings: The Cylinder Power of the lens is determined by the combination of the effective cylinder components on anterior (FC) and posterior (BC) molds.

According to optics principles, the combined cylinder is dependent on the relative axis angle between the FC and BC components.

The best way to understand this is to define the cylinder components as vectors. Each vector is defined by the Zernike components (e.g., X-astigmatism and y-astigmatism). For example, for a set of given FC and BC cylinder, the combined cylinder reaches maximum when the two vectors are aligned and minimum when the two are oppositely aligned.

Therefore, for a given pair of molds, the resulting cylinder error due to an unwanted cylinder component on the FC mold will be dependent on the target axis, which determines the relative rotation angle between the two molds.

When lens data from lenses with different target axes are plotted against the corresponding FC-cylinder values, the vertical scattering in the graph corresponds to the axis-dependency of the lens cylinder power error. If the molds are perfectly rigid and maintains their shapes during casting and curing, the minimum scattering is expected for FC-cylinder value of 0. However, due to the nature of non-rigid plastic molds, the effective cylinder contribution from FC molds is correlated to but not equal to the FC-cylinder value measured on the free form mold. Therefore, the minimum scattering is found at a non-zero FC-cylinder value for real data. And this non-zero FC-cylinder value defines the amount of compensation target FC-cylinder for free-form molds.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

All the publications, patents, and patent application publications, which have been cited herein above in this application, are hereby incorporated by reference in their entireties.

What is claimed is:

1. A method for manufacturing a toric contact lens, the method comprising the steps of:

a. determining an amount of a mold cylinder compensation which is caused by processes in a toric lens manufacturing system including tool making, injection molding, casting and curing wherein the mold cylinder is defined as the difference in measured radius of curvature at two orthogonal directions, b. Injection molding to form an anterior mold half and a posterior mold half for the same toric lens manufacturing system as in step a), wherein the posterior mold half or the anterior mold half has a toric portion and the other mold half has a prism ballast or double slab off, wherein each mold half has a tab or other locating features for facilitating a determination of orientation of the mold, c. measuring a mold cylinder value for the mold half having the prism ballast or double slab off, d. controlling the mold half having the prism ballast or double slab off to have a mold cylinder value between a high limit and a low limit by rejecting the mold half having the prism ballast or double slab off falling out of the limits, wherein the high limit is equal to or larger than the amount of the mold cylinder compensation plus a control tolerance and the low limit is equal to or less than the amount of the mold cylinder compensation minus the control tolerance, wherein the control tolerance is equal to or less than 0.050 mm, e. introducing a lens forming material into the anterior mold half, f. assembling the anterior mold half and the posterior mold half to form a lens shaped cavity there between, g. curing the lens forming material in the lens shaped cavity to form the toric lens, h. repeating the steps b) to g) for the same toric lens manufacturing system.

2. The method of claim 1, wherein the posterior mold half has a toric portion and the anterior mold half has the prism ballast or double slab off.

3. The method of claim 1, wherein the anterior mold half has a toric portion and the posterior mold half has the prism ballast or double slab off.

4. The method of claim 1, wherein the lens forming material comprises at least one member selected from the group consisting of a hydrophilic vinylic monomer, a silicone containing vinylic monomer, a silicone-containing crosslinker, a silicone-containing prepolymer, a hydrophilic prepolymer free of silicone, and combinations thereof.

5. The method of claim 1, wherein the curing step is performed by an ultraviolet curing.

6. The method of claim 1, wherein the curing step is performed by a thermal curing.

7. The method of claim 1, wherein the control tolerance is 0.040 mm.

8. The method of claim 1, wherein the control tolerance is 0.030 mm.

9. The method of claim 1, wherein the control tolerance is 0.020 mm.

10. The method of claim 1, wherein the control tolerance is 0.010 mm.

* * * * *